March 5, 1957    A. P. ARMINGTON ET AL    2,783,849
INDEPENDENTLY CONTROLLED HYDRAULIC POWER STEERING MEANS
FOR THE FRONT AND REAR WHEELS OF A VEHICLE
Filed April 22, 1953    2 Sheets-Sheet 1
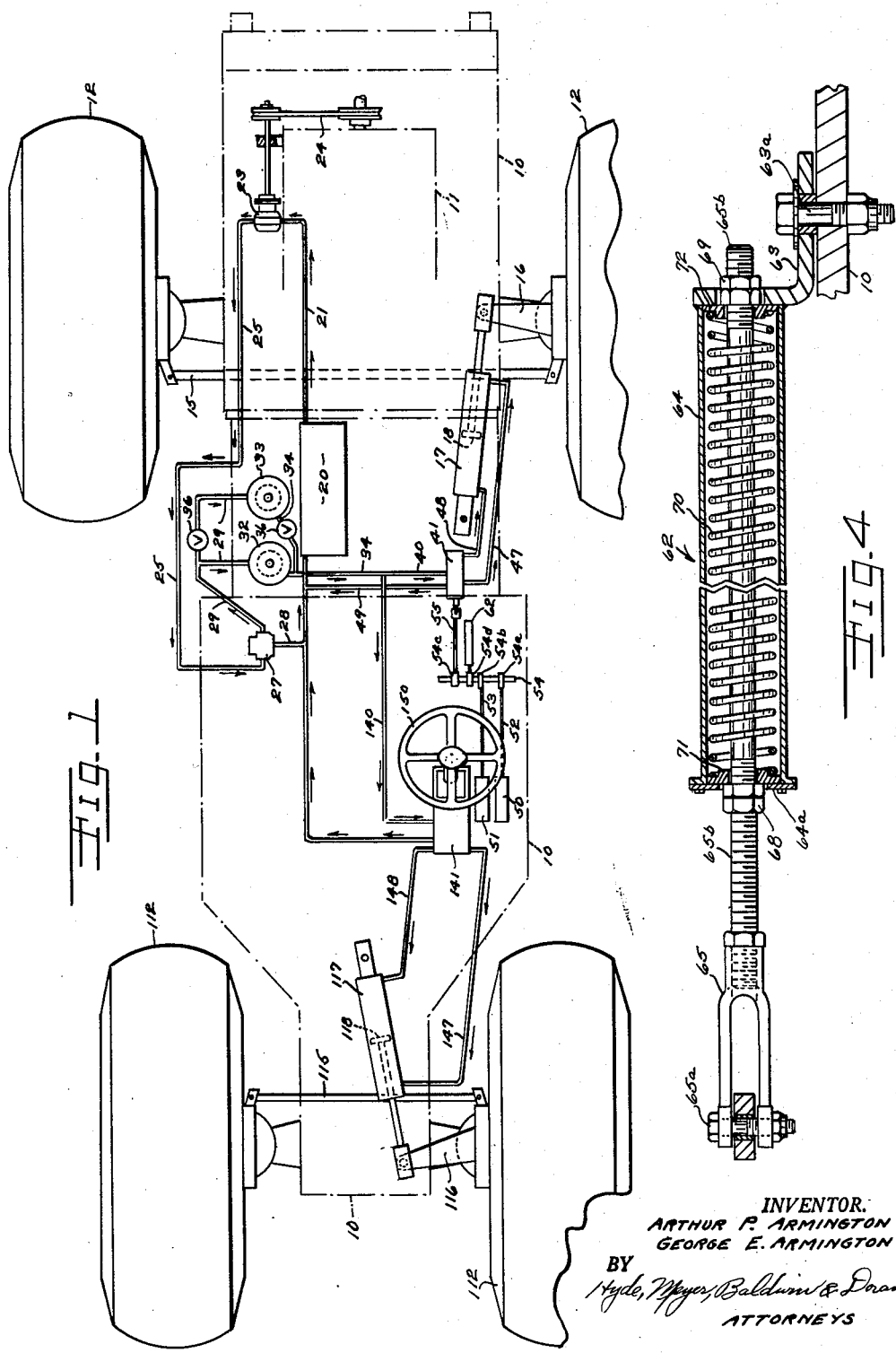
INVENTOR.
ARTHUR P. ARMINGTON
GEORGE E. ARMINGTON
BY
ATTORNEYS

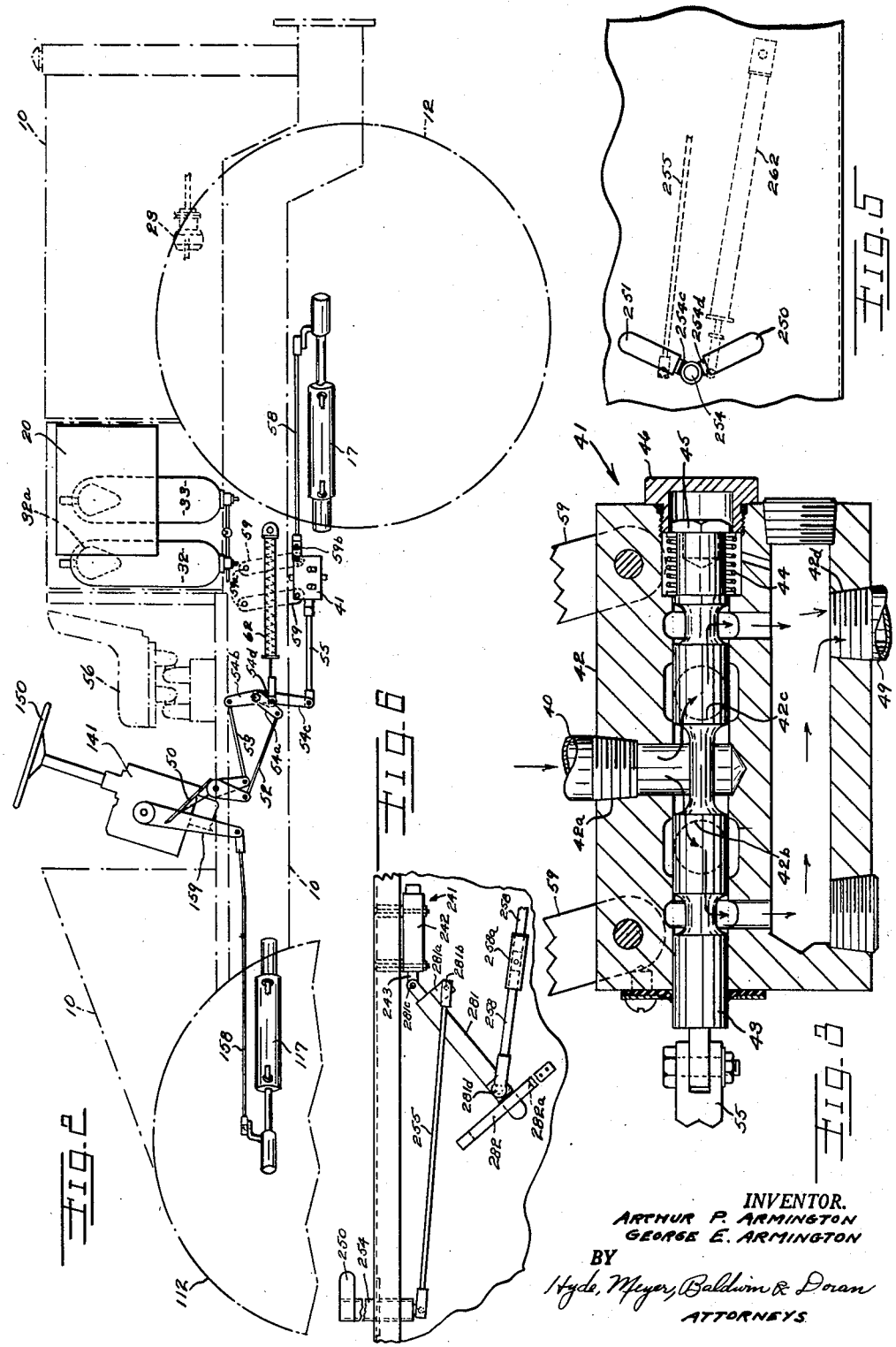

United States Patent Office 2,783,849
Patented Mar. 5, 1957

2,783,849

INDEPENDENTLY CONTROLLED HYDRAULIC POWER STEERING MEANS FOR THE FRONT AND REAR WHEELS OF A VEHICLE

Arthur P. Armington, Willoughby, and George E. Armington, Cleveland Heights, Ohio, assignors, by mesne assignments, to General Motors Corporation, Detroit, Mich., a corporation of Delaware Application April 22, 1953, Serial No. 350,445

5 Claims. (Cl. 180—79.2)

This invention relates to improvements in a vehicle steering arrangement and/or an hydraulic system.

One of the objects of the present invention is to provide a vehicle with front and rear wheels independently mounted thereon that can be simultaneously steered by a vehicle driver from a single location.

Another object of the present invention is to provide a vehicle having front and rear wheels independently steerably mounted so that all wheels can be steered for fast steering with sharp turns at low speeds while only the wheels at one end are steerable at high speed for sensitive steering.

Another object of the present invention is to provide a hydraulic system with an accumulator therein for storing up fluid energy when plentiful for use when the quantity is low at a later time.

Another object of the present invention is to provide hydraulic power steering for a vehicle using follower-type valves so that the steering action corresponds to the movement to the manual steering control.

Another object of the present invention is to provide a vehicle having power steering with the energy source being driven by the vehicle motor so that the energy output is proportional to the motor speed and having means for storing energy at high motor speeds for use at low motor speeds.

Other features in this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a top view of a schematic illustration of a vehicle having the hydraulic power steering system of the present invention;

Fig. 2 is a side elevational view of the vehicle and hydraulic power steering system of Fig. 1;

Fig. 3 is a vertical, longitudinal sectional view through the control valve in the hydraulic flow circuit for the power steering of the rear wheels;

Fig. 4 is a longitudinal sectional view of the rear wheels centering spring unit from Figs. 1 and 2;

Fig. 5 is a top plan view of a modified form of foot pedal operated rear wheel steering control but with some parts omitted for clarity; while Fig. 6 is a side elevational view of the Fig. 5 control in more detail but with some parts omitted for clarity.

Those familiar with this art recognize that this invention may be applied in many ways, but it has been chosen to illustrate the same in connection with a four-wheeled tractor. It should be readily apparent that the various features and elements of the steering mechanism can be used on vehicles or alone in various sub-combinations and combinations. It should also be realized that the accumulator and other elements of the hydraulic system can be used for purposes other than merely in a hydraulic power steering mechanism.

It has been found desirable to provide a tractor with a steering mechanism that provides quick maneuverability by sharp turns at low speeds as well as sensitive steering control at fast speeds. When the tractor operates at low speeds, it will probably be doing bulldozing and other similar work requiring quick maneuverability. At faster speeds, the tractor will be moving rapidly from place to place with sensitive steering being important since even a small steering action will turn the vehicle as quickly as desired. This invention provides steering mechanism for a tractor that will yield these desirable results.

The tractor disclosed in the drawings has a frame 10 with a pair of rear wheels 12, 12 and a pair of front wheels 112, 112 secured thereto in a manner to provide four-wheel drive by the tractor engine 11 as well as four-wheel steering. The connection between each wheel and the frame, drive engine 11 and steering mechanism may take the form of that disclosed in the copending U. S. patent application entitled "Drive Means for a Steering Wheel," Serial No. 139,947, filed by Walter S. Double on January 1, 1950, now abandoned. The two wheels in each pair, both the front and rear pair, are cross connected for joint steering operation by the usual tie rod, 15 or 115, with each pair of wheels being steerable by its associated steering arm, 16 or 116, that can be pivoted back and forth with respect to the tractor frame for steering its associated wheels.

It should be clearly understood that the terms "steerable wheel means" or "steerable rolling support means," as used in the claims, include not only the wheels illustrated in the drawings but also short endless crawler tracks as well as other equivalent structure.

Each pair of wheels can be steered independently for rapid or fast steering at slow speeds by a manually controllable hydraulic means including not only the steering mechanism described heretofore, but also hydraulic actuating cylinders and a hydraulic system for supplying control pressure fluid thereto. Each pair of wheels is steered by a hydraulic cylinder, 17 or 117, of the double-acting type pivotally connected at one end to the frame 10 while its associated piston, either piston 18 or 118, respectively is pivotally connected to the associated steering arm 16 or 116 respectively so that as each cylinder and piston unit lengthens or shortens, its associated pair of wheels will be steered farther to one side of or returned to a straight ahead position.

The hydraulic system has certain parts in common for steering both the front and rear wheels. It includes a hydraulic fluid storage tank 20 having a substantially incompressible hydraulic liquid that is used in the system. This tank 20 is connected to a flow line 21 through which the hydraulic liquid travels to a pump 23, serving as a source of hydraulic fluid pressure, with said pump being driven by the drive engine 11 through drive 24 so that it has a variable hydraulic liquid output approximately proportional to the speed of the drive engine 11. This hydraulic liquid under pressure is driven through line 25 to the pressure regulating unloading valve 27 provided with a relief valve to prevent excess pressure build up in the system by directing excess liquid through the return line 28 to the storage tank 20 when pressure becomes too high.

Under normal conditions, the hydraulic liquid flows through the line 29 to one or more accumulators 32 and 33. The accumulators serve as fluid pressure energy storage means for storing up fluid under pressure when pump output is high for use when the quantity of fluid output is low. Hence, the pump 23 will have a high output when the tractor is driven at relatively high speeds so that the accumulators 32 and 33 can store up this energy for use in fast and frequent steering at slow speeds when bulldozing with both pairs of wheels being turned simultaneously and rapidly and frequently through large steering arcs.

Each accumulator has an entrapped fixed quantity of compressible fluid, such as a gas or air either in a resilient stretchable and contractible sack 32a encased in the outer shell of the accumulator or in a closed chamber formed by said outer shell above and in direct contact with the surface of the hydraulic liquid in the bottom of the accumulator. The compressible fluid is in pressure-exerting relationship to the hydraulic fluid flowing through the inlet line 29 and the outlet line 34 therefrom. The compressibility of the fluid, such as gas or air, makes it possible to store a quantity of incompressible hydraulic liquid in each accumulator by compressing the gas or air; and then when the steering demands exceed the output of pump 23, the accumulators will return hydraulic liquid to the system during expansion of the compressed fluid or gas to cause a transformation of the potential energy in the gas in its compressed condition into hydraulic fluid pressure energy for steering the tractor.

Shut-off valves 36, 36 are provided in the inlet and outlet flow paths to accumulator 33 so that only one accumulator 32 instead of both may be used if desired.

It should be readily apparent that these accumulators 32 and 33 can be used in other hydraulic systems, either on or off a vehicle wherever a greater hydraulic liquid supply is intermittently required at lower pump speeds than the pump can deliver. Also, other hydraulically actuated mechanisms can be readily inserted into the hydraulic system disclosed herein in addition to the power steering.

It should now be apparent that the accumulators 32 and 33 can adequately supply an energy using means intermittently requiring a larger quantity of hydraulic fluid under pressure for a short period of time at slow engine speeds than the pump 23 can deliver. It should also be readily apparent that these accumulators are especially desirable in a hydraulic fluid pressure power steering means, hydraulically connected to this flow line 34 and including the mechanical parts associated therewith, since a bulldozing type tractor will require fast and frequent steering at low speeds which may readily exceed the capacity of the pump 23 when driven by the tractor motor at such low speeds.

Flow lines 40 and 140 branch off of flow line 34 for rear and front hydraulic steering respectively. Since both the front and rear hydraulic and mechanical steering mechanism is substantially the same, only the rear unit will be described.

A control valve means 41 is provided in the hydraulic system between the energy storage accumulators 32, 33 supplied by pump 23 and the hydraulic cylinder 17 for steering the rear wheels 12, 12 for holding back the hydraulic fluid under pressure in the accumulators until release is directed. The valve 41 includes a valve body member 42, as shown in Fig. 3, having a spring-loaded stem member 43 reciprocable therein and normally biased to a central or neutral position corresponding to the Fig. 3 illustration. A spring 44 surrounds one end of the stem member and is retained thereon between a washer abutting a shoulder on the stem member and a washer locked in place by nut 45 screwed onto said stem member with the washer on the right in Fig. 3 normally bearing against the left or inner face of a centering stop plug 46 secured in the valve body member 42. The valve body member 42 includes an inlet port 42a connected to flow line 40 from the accumulator, ports 42b and 42c connected respectively by flow lines 47 and 48 with the ports on the opposite ends of the hydraulic jack cylinder 17, and an exhaust port 42d for hydraulic liquid return through flow lines 49 back to the storage tank 20. Grooves are provided in the valve stem member 43 and the valve body member bore so that reciprocation of the valve stem member 43 will move the grooves into and out of registration for cutting off or permitting flow between the different valve body member ports.

When the valve stem member 43 is in the central position shown in Fig. 3, which is its normal position under the bias of spring 44, the valve stem member 43 cuts off fluid flow from pump 23 and the energy storage accumulators 32 and 33 to the hydraulic steering cylinder 17 through valve ports 42b and 42c and also cuts off exhaust flow to storage tank 20 through port 42d. Hence, not only piston 18 is locked in position to prevent steering movement by the hydraulic liquid since hydraulic cylinder exhaust valve ports 42b and 42c are closed but also no hydraulic liquid circulates from the pump 23 and the accumulators 32, 33 through the valve 41 back to the storage tank 20. Therefore, the energy stored in the accumulators 32 and 33 is not needlessly dissipated and the constant running of the pump 23 will continue as long as necessary to build up the energy reserve in the accumulators. The unloading valve 27 not only automatically relieves the pump 23 of working under high hydraulic liquid pressure after the capacity of accumulators 32 and 33 to receive hydraulic liquid has been reached, but also automatically closes the pump by-pass when accumulators 32 and 33 are partially or fully discharged.

The valve stem member 43 can be reciprocated relative to the valve body member 42 to either of two operative positions on opposite sides of said central position, one on the left and the other on the right thereof. When the valve stem member 43 is moved to the right of center, it should be apparent that fluid pressure flow takes place through flow line 40, inlet port 42a in Fig. 3, port 42c, flow line 48 and into the left end of hydraulic steering cylinder 17 in Fig. 1 to urge piston 18 toward the right to rotate steering arm 16 clockwise. The hydraulic fluid in the right end of the cylinder 17 is exhausted through the flow line 47, port 42b in Fig. 3, along the direction of the flow arrows through exhaust port 42d and return line 49 to the storage tank 20. It should be apparent that moving the valve stem member 43 to the left will cause in a similar manner a shortening of the hydraulic hoist cylinder and piston units 17 and 18 by exhausting the left side of the cylinder 17 in Fig. 1 while fluid pressure is admitted to the right side thereof. During either movement, spring 44 is compressed, either by the shoulder on valve stem member 43 or by the washer secured thereto by nut 45, so that valve stem member 43 is always resiliently urged back toward its central, flow cut-off position.

Foot controlled pedals 50 and 51 in Figs. 1 and 2 are operatively connected with the valve stem member 43. Pedals 50 and 51 are each pivotally mounted on the frame 10 for independent movement by alternate manipulation of the operator's left foot. Each pedal has a downwardly extending arm. A four-armed lever 54 is rotatably mounted on the frame 10 behind and below the pedals with links 52 and 53 pivotally connected to arm 54a and 54b of said lever and pivotally connected to the downwardly extending arms of pedals 50 and 51 respectively. A third arm 54c of lever 54 is connected to the valve stem member 43 by a link 55 having pivotal connections at opposite ends. It should be readily apparent that foot operation of the pedals 50 and 51 by the tractor operator while in the driver's seat 56 will cause the rear wheels 12, 12 to be steered accordingly.

The steering swing of rear wheels 12, 12 corresponds to the movement of the steering pedals 50 and 51 since control valve 41 is a follower-type valve having a mechanical connection for returning the valve to its neutral, central, flow cut-off position upon completion of a steering movement. This is provided by a control valve follower mounting means connecting hydraulic cylinder 17, hydraulic piston 18, vehicle frame 10, and valve body member 42 for causing the valve body member 42 to move in a compensating manner toward the central cut-off position upon the actuation of valve stem member 43 by either pedal 50 or 51. This is specifically shown in Fig. 2 of the present construction by a follower arm 58 pivotally mounted at its right end to the piston rod and at its left end at 59b to one of two parallel, equal length supporting brackets 59, 59 pivoted to the frame 10 at 59a, 59a with the valve body member 42 pivotally secured to these supporting brackets 59, as shown in Fig. 2. These parts have been omitted in Fig. 1 for clarity. Of course, the opposite ends of the hydraulic cylinder 17 and piston 18 are pivotally mounted respectively to the frame 10 and steering arm 16, as mentioned before. It should be readily apparent that actuation of pedal 50 or 51 to move the valve stem member 43 to either its left or right position will cause, upon change in length of the hydraulic hoist cylinder and piston steering units, the movement of valve body member 42 in a compensating manner toward the central cut-off position. For example, when pedal 50 is depressed, valve stem member 43 is moved to the right. Then, as described heretofore, as the valve stem member 43 is moved to the right in Fig. 3, the hydraulic cylinder and piston unit increases in length. Then, follower arm 58 will be pulled to the right by the piston rod, since the cylinder 17 is secured to the frame, and this arm will pull the valve body member 42 also toward the right so that valve stem member 43 in reality actually moves to the left relative to the valve body member 42 until the central cut-off position is reached to prevent further expansion of the hydraulic cylinder steering unit.

Hence, the final steered position of wheels 12 will correspond with the angular position of pedals 50, 51. For example, if the wheels are to be turned through a large steering angle, the pedals must be continuously actuated during turning to keep the valve stem member 43 in one of its end positions since follower arm 58 continually attempts to move the valve body member 42 relative thereto.

It should be readily apparent that the valve members, the valve body member 42 and the valve stem member 43, may be readily interchanged in this follower mounting structure and the same results will be obtained since only the relative movement between these members is important.

The front wheels 112, 112 are steered in a similar manner and have corresponding parts therefor. The front wheels are steered by rotating a steering wheel 150, corresponding to pedals 50 and 51, to move a valve stem member on a valve, corresponding to valve 41, through a gear type speed reducer with both the valve and speed reducer located in housing 141. Successful results have been achieved with a speed reducer making a given angular steering wheel movement turn the front wheels 112 through an angle one-tenth to one twenty-fifth as large. The front wheel steering also has a hydraulic cylinder 117, flow lines 147 and 148, follower arm 158 and follower bracket 159 that respectively corresponds to the previously described hydraulic cylinder 17, flow lines 47 and 48, follower arm 58 and follower brackets 59, 59 used in steering the rear wheels 12, 12.

When this tractor is used for bulldozing or is operating at slow speeds, it is frequently necessary to make sharp turns by so-called fast steering wherein either foot pedal 50 or 51 as well as a hand-operated steering wheel 150 are actuated to turn simultaneously both the rear and front wheels to make a sharp turn possible. At higher speeds when moving rapidly from place to place, sensitive steering is more important so that only the hand wheel 150 is turned for steering the front wheels while the rear wheels 12, 12 are kept in a straight ahead position by a self-centering means. This self-centering means automatically urges toward and returns rear wheels 12, 12 to a straight ahead position upon discontinuance of manual operation of foot pedals 50 and 51. It takes the form in the present disclosure of a spring unit 62 in Figs. 1, 2 and 4 pivotally attached at one end to the vehicle frame 10 and pivotally secured at its other end to the fourth arm 54d of lever 54.

Spring unit 62 in Fig. 4 includes at one end a bracket 63 pivoted to the frame at 63a and secured to a tubular spring housing 64 to form the right end wall thereof and includes at the other end a link 65 pivoted to the arm 54d at 65a and having a shaft 65b extending through aligned apertures in the left end wall 64a of housing 64 and in the right end wall formed by bracket 63. The shaft 65b has a pair of lock nuts 68 and 69 at opposite ends with each pair freely movable through the hole in its associated end wall. A coil spring 70 surrounds shaft 65b and bears against collars 71 and 72 with these collars normally prevented from moving apart respectively by lock nut pair 68 and left end walls 64a and by lock nut pair 69 and the housing right end wall. Hence, the spring unit is normally held in the Fig. 4 position for centering the back wheels by the compressive force of spring 70. When the wheels are turned, the distance between pivots 63a and 65a can be either shortened or lengthened by further compressing spring 70, but spring 70 will always urge the centering spring unit parts back to the equilibrium position in Fig. 4.

Thus, when the rear wheels 12, 12 are on either side of the straight ahead position, the unbalanced force exerted by compression spring 70 on the arm 54d will tend to rotate the arm 54d to a central, equilibrium position with the rear wheels straight ahead. It should be noted that the centering action also requires the follower mounting structure with follower arm 58 and supporting brackets 59, 59 so that relative movement between the valve members 42 and 43 will cause a change in length of the hydraulic cylinder and piston units 17 and 18 with a compensating movement of the valve members 42 and 43 back toward the central cut-off position. It should be apparent now that release and non-actuation of foot pedals 50 and 51 will be followed by the turn of the quickly fast-steered wheels 12, 12 to their straight ahead position where they will be normally maintained while sensitive steering can be caused by rotating the hand-operated steering wheel 150 to turn the front wheels 112, 112.

This spring unit 62 provides two advantages in that (1) less operator attention is required in recovering from steering movements and (2) the rear wheels have an inherent tendency to take care of themselves except when steering is desired.

A preferred form of pedal control and follower-type valve construction for the rear wheels is shown in Figs. 5 and 6.

It will be noted that the rear wheel steer control in Figs. 5 and 6 from foot operated pedals 250 and 251 to link 255 operates basically the same as the Fig. 2 control from pedals 50 and 51 to link 55 but the Fig. 5 construction is simpler. Foot controlled pedals 250 and 251 form arms of a shaft 254 pivotally mounted on the floor board of frame 10 for independent movement by alternate manipulation of the operator's left foot to steer the rear wheels 12, 12 accordingly. Shaft 254 has radial arms 254c and 254d thereon pivotally connected respectively to link 255 and centering spring 262 in the manner corresponding as arms 54c and 54d in Fig. 2. Spring unit 262 has the same construction as spring unit 62 and is pivotally connected to the frame at the right in Fig. 5 so that spring unit 262 also always resiliently urges shaft 254 back to the position corresponding to the rear wheels straight ahead position. Therefore, link 55 in Fig. 2 and link 255 in Figs. 4 and 5 move in basically the same manner when either pedals 250 and 251 are actuated or spring unit 262 exerts its centering force.

The follower-type valve structure in Fig. 6 is responsive to the movements of link 255 and follower arm 258 in the same manner as the structure in Fig. 2 is responsive to the movements of link 55 and follower arm 58. Even though not shown in Figs. 5 and 6, the same hydraulic system, hydraulic cylinder 17 and piston 18 of Fig. 1 as well as the pivotal right end connection of follower arm 58 in Fig. 2 is used. The construction and mode of operation of control valve 241, valve body member 242, and valve stem member 243 is the same as the corresponding parts in Fig. 3 having corresponding reference numerals minus the 200 prefix.

The steering swing of rear wheels 12, 12 corresponds to the movement of the steering pedals 250 and 251 since control valve 241 is a follower-type valve having a mechanical connection for returning the valve to its neutral, central, flow cut-off position upon completion of a steering movement. This is provided by a control valve follower mounting means connecting hydraulic cylinder 17, hydraulic piston 18, vehicle frame 10, and valve stem member 243 for causing the valve stem member 243 to move in a compensating manner toward the central cut-off position upon the actuation of valve stem member 243 by either pedal 250 or 251. This is specifically shown in Fig. 6 of the present construction by a floating or differentiating lever, rectangular in cross section, pivotally connected to pedal or spring actuated link 255, valve stem member 243, and follower arm 258 respectively by pivot 281b on an arm 281a of lever 281, pivot 281c, and pivot 281d. A guide means rod 282, fixed at its lower end to the vehicle frame, has a slot 282a (having width in a view 90° to the plane of the drawing) to receive and guide lever 281 against twisting or swinging in any direction except that desired for operation of the mechanism by restrained movement in the slot.

Parts have been omitted in Figs. 5 and 6 for clarity. Of course, the opposite ends of the hydraulic cylinder 17 and piston 18 are pivotally mounted respectively to the frame 10 and steering arm 16, as mentioned before. It should be readily apparent that actuation of pedal 250 or 251 to move the valve stem member 243 to either its left or right position will cause, upon change in length of the hydraulic cylinder and piston steering units, the movement of valve stem member 243 in a compensating manner toward the central cut-off position. When pedal 250 is depressed causing valve stem member 243 to move to the right since pivot 281d acts as a stationary fulcrum, the hydraulic cylinder and piston unit increases in length in the same manner as described before for similar movements of pedal 50 and valve stem member 43. Then, when the vehicle operator ceases to move the pedals further, follower arm 258 will be pulled to the right by the piston rod, since the cylinder 17 is secured to the frame, and this arm will pull the valve stem member 243 toward the left, since pivot 281b connected with the pedals acts as a stationary fulcrum, until the central valve cut-off position is reached to prevent further expansion of the hydraulic cylinder steering unit. The overall effect is that travel of pedals 250, 251 is reflected by a proportional steering movement at rear wheels 12 to give the operator a sense of feel of the steered position of the wheels for a given pedal travel.

It should be readily apparent that the valve members, the valve body member 242 and the valve stem member 243, may be readily interchanged in this follower mounting structure and the same results will be obtained since only the relative movement between these members is important. However, the Fig. 6 construction is preferred because the valve 241 does not move, since it is fixed to the vehicle frame, so that no flexible hoses are required.

Turn buckle 258a is provided on follower arm 258 for adjusting the relationship between the foot pedals and rear wheels so that the pedals are at a desired neutral position when the wheels are straight ahead. A similar turn buckle could be added for the same purpose to corresponding follower arm 58 in Fig. 2.

It should be readily apparent that the valve follower structure in Fig. 6 between link 255 and follower arm 258 can be used for front wheel steering by substitution in Fig. 2 between the gear speed reducer in housing 141 and follower arm 158.

The rear wheel steering mechanism in both Figs. 2 and 6 have been successfully constructed wherein a given angular movement of either pedals 50, 51 or pedals 250, 251 causes the same angular steering movement of the rear wheels 12 for so-called quick steering. As mentioned before, successful results have been achieved for so-called finely graduated sensitive steering of the front wheels when a given angular movement of steering wheel 150 will turn the front wheels 112 through an angle only one-tenth to one twenty-fifth as large. Therefore, it may be said that the "movement advantage" of the rear wheel steering control is 1/1 and of the front wheel steering control is 1/10 to 1/25 with the rear wheel steering control having a relative "movement advantage" between ten and twenty-five times that of the front wheel steering control. This relative "movement advantage" should have, in practice, a minimum between five to ten.

Heretofore in this description, double-acting hydraulic cylinder and piston units 17, 18 and 117, 118 have been described as providing the power steering for the tractor wheels. However, it should be readily apparent that single acting cylinder and piston units can be used instead with a spring return and a port on only one end with the control valve controlling both the admission and exhaust of fluid flow to and from its associated hydraulic cylinder.

It should be readily apparent that the accumulators 32 and 33 need not be in the hydraulic circuit for steering both the front and rear pairs of wheels but may be used in steering only one pair, and more particularly the rear pair, since the rear wheels are generally used only when fast steering is desired at low speeds so that sharp and frequent turns can be made.

All steering members are readily accessible from the operator's seat 56 so that they can be moved singularly, independently or simultaneously. The hand-controlled steering wheel 150 steers the front wheels 112, 112 while foot pedals 50 and 51 or 250 and 251 may be manipulated alternatively under the driver's left foot for steering the rear wheels 12, 12. However, the rear wheels are only steered when necessary; they are normally kept in a straight ahead position. The tractor is quickly maneuverable by sharp turns at low speeds in the nature of 1.5 miles per hour and also has sensitive steering control for steering at faster speeds in the nature of 30 miles per hour. When operating at low speeds, the tractor will probably be doing bulldozing and other similar work so that it must be quickly maneuverable by steering both the front and rear wheels independently. At the higher or faster speeds, only the front wheels are steered to provide sensitive steering control while the rear wheels are kept in a straight ahead position.

Fast steering, with both frequent change in direction and steering both the front and rear wheels to their extreme positions for turning in a small circle, requires a large volume of oil or equivalent hydraulic liquid to quickly and frequently operate the hydraulic jacks or the cylinder and piston units at the front and rear of the tractor for steering the wheels. The accumulators 32 and 33 store up liquid under pressure when pump output is high for use when the output is low at slow engine speeds when these hydraulic jacks require, for a short period of time, a larger quantity of hydraulic liquid under pressure than the pump can deliver. The stored up energy in the accumulators for power steering has the advantage of offering full and instantaneous steering response to the actuation of steering wheel 150 and foot operated pedals 50 and 51 or 250 and 251. This is extremely desirable since most maneuvering and sharp turns and most operator effort to maneuver occurs at slow speeds during which time hydraulic liquid power for power steering from pump 23 driven by the tractor engine 11 is at a minimum while effort required is at a maximum; this stored-up energy in the accumulators 32 and 33 supplies the energy for power steering when it is most needed.

The present invention includes other modifications than that illustrated wherein the steering of the front wheels is controlled by hand wheel 150 through a gear reduction for sensitive steering at high speeds and the steering of the rear wheels is controlled by directly connected foot pedals (50, 51 or 150, 151) for quick or fast steering at slow speeds. First, the rear wheels can be controlled through a gear reduction for sensitive steering while the front wheels can be directly controlled for quick steering so that the vehicle will have the same mode of operation but the wheel steering mechanisms will be interchanged. Second, each manual control member 50, 51; 150; or 250, 251 can take the form of a lever, steering wheel, or pedal, whichever is desired.

Various changes in details and arrangement of parts can be made by one skilled in the art without departing from the spirit of this invention or the scope of the appended claims.

What is claimed is:

1. A vehicle, comprising a vehicle frame, a first steerable rolling support means on said frame located at the front of said vehicle and a second steerable rolling support means on said frame located at the rear of said vehicle, first manually controllable hydraulic means on said frame for steering one of said rolling support means into positions angular with respect to a straight ahead position and on either side thereof, second manually controllable hydraulic means operable independently of said first controllable means for steering the other of said rolling support means into positions angular with respect to a straight ahead position and on either side thereof, and self-centering means for automatically returning said other rolling support means to a straight ahead position upon discontinuance of manual operation of said second manually controllable hydraulic means, whereby the first manually controllable means can be actuated at high speeds for sensitive steering control with the self-centering means keeping the second manually controllable means in the straight ahead position and whereby both manually controllable means can be actuated at low speeds for quick maneuverability; said second manually controllable means having a movement advantage several times more than that of said first manually controllable means, said second manually controllable hydraulic means and said self-centering means including a fluid pressure operated piston and cylinder unit connected at opposite ends to said frame and said other rolling support means respectively, including a control valve for said unit having a valve body member in communication with a source of high pressure fluid and with port means connected in fluid communication with said cylinder, said control valve having a valve stem member reciprocable within said valve body member and having means when said members are in a central position for cutting off fluid flow from said source to said port means and when said members are in a position on one side of said central position for controlling fluid flow between said source and said cylinder for moving the piston in one direction and when said members are in a position on the other side of said central position for controlling fluid flow between said source and said cylinder for moving the piston in the opposite direction, including control valve follower mounting means connecting said cylinder and piston and vehicle frame and one of said valve members for causing said one valve member to move in a compensating manner toward said central cutoff position upon actuation of the other of said valve members, and including a centering spring connected to said vehicle frame and movable with said other valve member for resiliently urging it at all times into a position corresponding to said straight ahead position of said other rolling support means.

2. A vehicle, comprising a vehicle frame, a first steerable rolling support means on said frame located at the front of said vehicle and a second steerable rolling support means on said frame located at the rear of said vehicle; first manually controllable hydraulic means on said frame including a gear speed reducer for steering one of said rolling support means into positions angular with respect to a straight ahead position and on either side thereof, second manually controllable hydraulic means operable independently of said first controllable means for steering the other of said rolling support means into positions angular with respect to a straight ahead position and on either side thereof, a given angular movement of said second manually controllable means causing a corresponding angular movement of said other rolling support means and self-centering means for automatically returning said other rolling support means to a straight ahead position upon discontinuance of manual operation of said second manually controllable hydraulic means, whereby the first manually controllable means can be actuated at high speeds for sensitive steering control with the self-centering means keeping the second manually controllable means in the straight ahead position and whereby both manually controllable means can be actuated at low speeds for quick maneuverability; said second manually controllable hydraulic means and said self-centering means including a double acting fluid pressure operated piston and cyclinder unit connected at opposite ends to said frame and said other rolling support means respectively, including a control valve for said unit having a valve body member in communication with a source of high pressure fluid and with two ports connected in fluid communication with respective opposite ends of said cylinder, said control valve having a valve stem member reciprocable within said valve body member and having means when said members are in a central position for cutting off fluid flow from said source to said two last mentioned ports and when said members are in a position on one side of said central position for admitting and exhausting pressure fluid to said cylinder for moving the piston in one direction and when said members are in a position on the other side of said central position for admitting and exhausting pressure fluid to said cylinder for moving the piston in the opposite direction, including control valve follower mounting means connecting said cylinder and piston and vehicle frame and one of said valve members for causing said one valve member to move in a compensating manner toward said central cutoff position upon actuation of the other of said valve members, and including a centering spring connected to said vehicle frame and movable with said other valve member for resiliently urging it at all times into a position corresponding to said straight ahead position of said other rolling support means.

3. A valve controlled hydraulic cylinder follower mechanism, comprising a frame, a fluid jack comprising a cylinder member and piston member with one of said members operatively connected to said frame and the other movable relative thereto, said cylinder member having inlet port means, valve means connected between a fluid pressure source and said cylinder member port means having a valve body member and a valve stem member, one of said valve members connected to said frame and the other member movable relative thereto between two operative positions respectively either connecting for flow in a first position said port means with said pressure source or in a second position preventing flow therebetween, a follower member on said movable fluid jack member, a control member, and a floating lever, guide means for said lever having a slot therein into which one end of said floating lever extends, and means pivotally connecting said lever at spaced points to said follower member and control member and said movable valve member, whereby one of said first two mentioned floating lever pivots acts as a fulcrum when the other is actuated until said other valve member reaches said second position.

4. A vehicle, comprising a vehicle frame, a first steerable rolling support means on said frame located at the front of said vehicle and a second steerable rolling support means on said frame located at the rear of said vehicle, first manually controllable hydraulic means on said frame including a gear speed reducer for steering one of said rolling support means into positions angular with respect to a straight ahead position and on either side thereof, second manually controllable hydraulic means operable independently of said first controllable means for steering the other of said rolling support means into positions angular with respect to a straight ahead position and on either side thereof, a given angular movement of said second manually controllable means causing a corresponding angular movement of said other rolling support means and self-centering means for automatically returning said other rolling support means to a straight ahead position upon discontinuance of manual operation of said second manually controllable hydraulic means, whereby the first manually controllable means can be actuated at high speeds for sensitive steering control with the self-centering means keeping the second manually controllable means in the straight ahead position and whereby both manually controllable means can be actuated at low speeds for quick maneuverability; said second manually controllable hydraulic means and said self-centering means including a double acting fluid pressure operated piston and cylinder unit connected at opposite ends to said frame and said other rolling support means, including a control valve for said unit having a valve body member in communication with a source of high pressure fluid and with two ports connected in fluid communication with respective opposite ends of said cylinder, said control valve having a valve stem member reciprocable within said valve body member and having means when said members are in a central position for cutting off fluid flow from said source to said two last mentioned ports and when said members are in a position on one side of said central position for admitting and exhausting pressure fluid to said cylinder for moving the piston in one direction and when said members are in a position on the other side of said central position for admitting and exhausting pressure fluid to said cylinder for moving the piston in the opposite direction, including one of said valve members fixed to the frame, including control valve follower mounting means connecting said cylinder and piston and vehicle frame and the other of said valve members for causing said other valve member to move in a compensating manner toward said central cutoff position upon actuation of itself, and including a centering spring connected to said vehicle frame and said other valve member resiliently urging it at all times into a position corresponding to said straight ahead position of said other rolling support means.

5. A valve controlled pressure fluid actuated cylinder follower mechanism, comprising a frame, a fluid pressure operated piston element and cylinder element unit with one of said elements operatively connected to said frame and the other movable relative thereto, a control valve for said unit having a valve body member in communication with a source of high pressure fluid and with port means connected in fluid communication with said cylinder element, said control valve having a valve stem member reciprocable within said valve body member and having means when said members are in one position for cutting off fluid flow from said source to said port means and when said members are in another position for controlling fluid flow between said source and said cylinder for moving one of the elements in one direction, and control valve follower mounting means connecting said cylinder element and piston element and vehicle frame and one of said valve members for causing said one valve member to move in a compensating manner toward said central cutoff position upon actuation of the other of said valve members, said mounting means including parallel links pivotally connected at opposite ends to said frame and said one valve member.

References Cited in the file of this patent

UNITED STATES PATENTS

| | | |
|---|---|---|
| 867,282 | Macfarren | Oct. 1, 1907 |
| 1,084,430 | Harris | Jan. 13, 1914 |
| 1,627,568 | Martin | May 10, 1927 |
| 1,995,588 | Secor | Mar. 26, 1935 |
| 2,020,041 | Rockcastel et al. | Nov. 5, 1935 |
| 2,141,697 | Russell | Dec. 27, 1938 |
| 2,163,892 | Sanford et al. | June 27, 1939 |
| 2,164,308 | Centervall | July 4, 1939 |
| 2,195,932 | Maloney et al. | Apr. 2, 1940 |
| 2,363,977 | Kucher | Nov. 28, 1944 |
| 2,411,119 | Stephens | Nov. 12, 1946 |
| 2,424,617 | Hoyle | July 29, 1947 |
| 2,427,340 | Allison | Sept. 16, 1947 |
| 2,429,185 | Hukill | Oct. 14, 1947 |
| 2,506,093 | MacDuff | May 2, 1950 |
| 2,512,979 | Strother | June 27, 1950 |
| 2,554,315 | Price | May 22, 1951 |
| 2,646,850 | Brown | July 28, 1953 |
| 2,674,092 | Gardiner | Apr. 6, 1954 |

FOREIGN PATENTS

| | | |
|---|---|---|
| 629,649 | France | Nov. 14, 1927 |
| 335,539 | Great Britain | Sept. 24, 1930 |
| 406,842 | Italy | July 28, 1948 |